United States Patent
De Ruijter et al.

(10) Patent No.: US 8,615,213 B2
(45) Date of Patent: Dec. 24, 2013

(54) REDUCING POWER CONSUMPTION OF A FILTER

(75) Inventors: Hendricus De Ruijter, Sunnyvale, CA (US); Ping Xiong, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 78 days.

(21) Appl. No.: 13/229,969

(22) Filed: Sep. 12, 2011

(65) Prior Publication Data

US 2013/0065546 A1    Mar. 14, 2013

(51) Int. Cl.
*H04B 1/06*    (2006.01)

(52) U.S. Cl.
USPC ........... 455/266; 455/130; 455/134; 455/135; 455/306; 455/307

(58) Field of Classification Search
USPC ........ 455/130, 134, 135, 161.3, 185.1, 190.1, 455/293, 306, 307, 339, 340, 266
See application file for complete search history.

(56) References Cited

U.S. PATENT DOCUMENTS

2010/0119019 A1*   5/2010   Ito .................................. 375/344
2011/0212698 A1*   9/2011   Le Guillou et al. ........ 455/196.1

OTHER PUBLICATIONS

Silicon Labs, "EZRadio and EZRadio Pro, Complete Family of Transmitters, Transceivers and Receivers," 2010, pp. 1-2.
U.S. Appl. No. 13/097,698, filed Apr. 29, 2011, entitled "Performing Testing in a Radio Device," by Hendricus De Ruijter.

* cited by examiner

*Primary Examiner* — Tuan Pham
(74) *Attorney, Agent, or Firm* — Trop, Pruner & Hu, P.C.

(57) ABSTRACT

In one embodiment, the present invention includes a system that having a low noise amplifier (LNA) to receive and amplify a radio frequency (RF) signal, a mixer to receive and downconvert the RF signal to a second frequency signal, a filter to receive and filter the second frequency signal, a demodulator to receive and demodulate the filtered second frequency signal to output demodulated data, and a quality detector to detect a quality of the demodulated data and output a quality indicator based on the data quality. In addition, the system can include a controller coupled to the filter to cause a state of the filter to be stored into a storage responsive to the quality indicator.

15 Claims, 5 Drawing Sheets

REDUCING POWER CONSUMPTION OF A FILTER

BACKGROUND

Filters are commonly used components in many different circuit types. In the context of radios, filters are used to remove noise from signals being processed in different frequency domains. For example, in receivers that convert an incoming RF signal to an intermediate or low intermediate frequency signal, a DC component output by a mixer might disturb the reception and can be filtered out by a DC filter to improve receiver performance such as receive sensitivity. This DC filter usually has a very low corner frequency such that its filtering has a minimum effect on the desired received signal. The lower the corner frequency however, the more time it takes for the filter to settle after the receiver is enabled. This extended settling duration adds to the power consumption and to a transmit-to-receive turnaround time in cases where the receiver is combined with a transmit function.

SUMMARY OF THE INVENTION

According to one aspect, the present invention includes a receiver having a signal processing path to receive and process an incoming radio frequency (RF) signal to obtain a demodulated signal. This path can include one or more filters, where a filter state of at least one filter can be stored and restored to enable a faster re-settling time. To this end, the receiver may include a quality detector to detect a quality level of the demodulated signal and output a quality indicator based on at least one of the quality level of the demodulated signal, a quality metric of the incoming RF signal, and a quality metric of a signal being processed in the signal processing path. In turn, a controller coupled to the filter may cause a state of the filter to be stored in a memory responsive to the quality indicator, and cause the stored state to be restored to the filter when the receiver is re-enabled from a low power state.

As one example, a filter can include a first amplifier to receive the downconverted signal, where the first amplifier has a first programmable amplification value and outputs a first amplifier value, and a second amplifier to receive a delay cell output, where the second amplifier has a second programmable amplification value and outputs a second amplifier value. In turn, a combiner of the filter can sum the first and second amplifier values to generate a filter estimate, and a second combiner can remove the filter estimate from the downconverted signal to output a filtered signal.

Another aspect of the present invention is directed to a method that includes receiving and processing an incoming RF signal in a receiver to obtain a demodulated signal, allowing a filter in a signal processing path of the receiver to settle, and storing a filter state of the filter in a storage area responsive to a signal quality metric of the demodulated signal being at least at a threshold level. Thereafter, this stored filter state can be obtained from the storage area and provided to the filter when re-enabling the receiver. As examples, the signal quality metric can be at least one of a preamble detection, a synchronization word detection, a valid checksum computation, and a received signal strength indicator.

A still further aspect of the present invention is directed to a system that includes a low noise amplifier (LNA) to receive and amplify a radio frequency (RF) signal, a mixer to receive and downconvert the RF signal to a second frequency signal, a filter to receive and filter the second frequency signal, a demodulator to receive and demodulate the filtered second frequency signal to output demodulated data, and a quality detector to detect a quality of the demodulated data and output a quality indicator based on the data quality. In addition, the system can include a controller coupled to the filter to cause a state of the filter to be stored into a storage responsive to the quality indicator. By storage of this state and the later restoring of the state back to the filter, the filter, which may be a DC filter, can re-settle within a first time period that is substantially less than a second time period at which the filter settles without the stored state.

DETAILED DESCRIPTION

In various embodiments, a state of a filter can be maintained in a storage mechanism when it is determined that an appropriate level of quality with regard to a filtered signal has been achieved. By way of this state storage, embodiments may enable improved performance and power consumption. Specifically, by storing one or more state values of a filter present in a receiver, a reduced settling time can be achieved upon a re-settling of the filter on a different enabling of the receiver, by initializing the filter with this saved value. Furthermore, because of this reduced settling time, power consumption can be reduced. That is, assume that a receiver periodically awakens to detect the presence of signals directed to it. By way of a faster settling, the presence or absence of incoming signals for the receiver can be determined more quickly and accordingly the receiver can more rapidly return to a low power mode when it is determined that no signals are being directed to it. Although described herein in the context of a receiver, which may be a standalone receiver or part of a transceiver, persons of ordinary skill in the art understand that the scope of the present invention is not limited in this regard and in various embodiments filter state storage as described herein can be applied to other environments in which a filter is used. For example, such state storage can be used in sensor devices using e.g., a low duty cycle mode. Also devices that use some form of successive approximation (or binary search) may benefit such that the range of the successive approximation can be adjusted based on a previous measurement, saving active time and hence power consumption.

Figure 1:
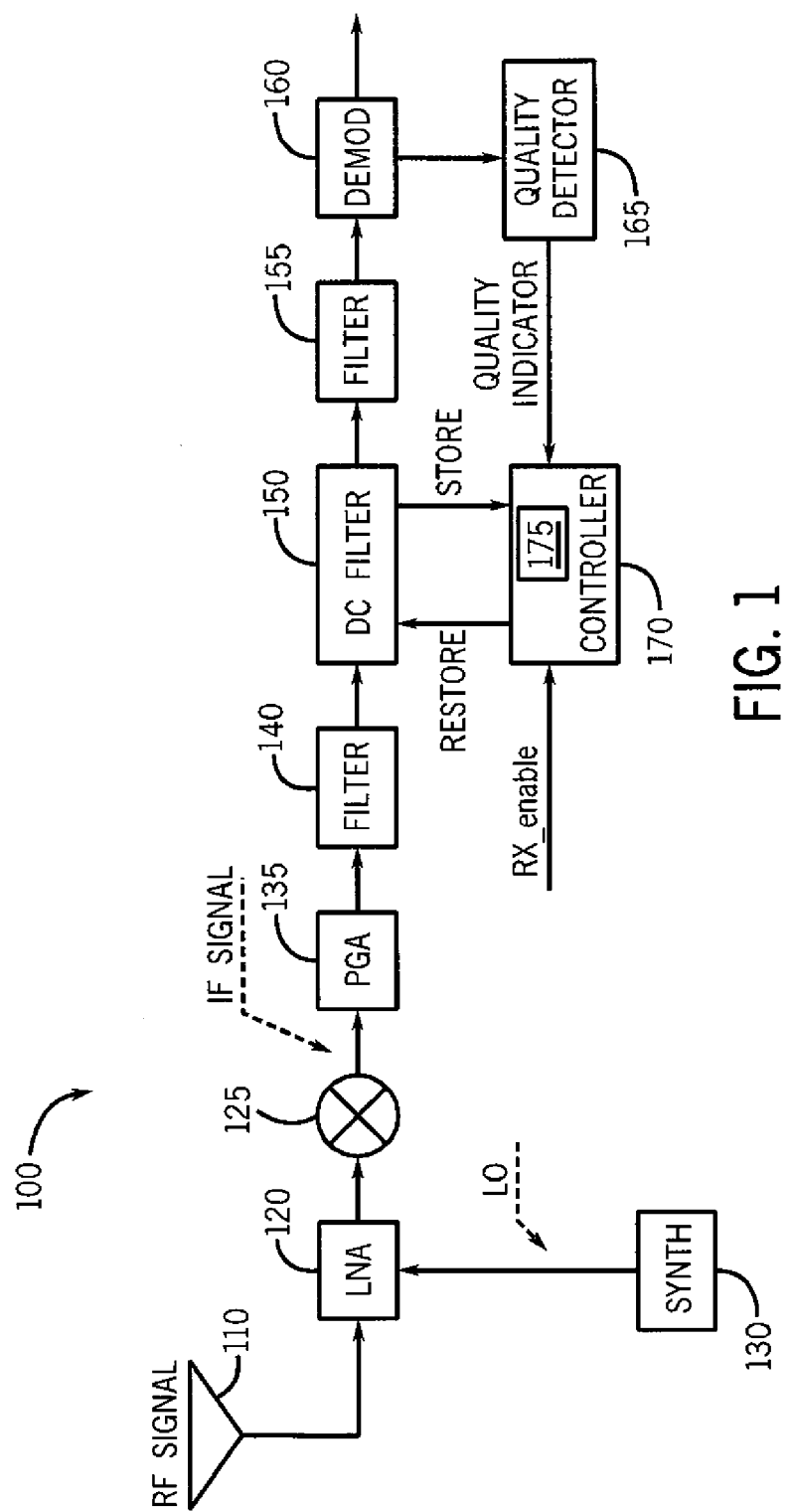
FIG. 1 is a block diagram of a portion of a receiver in accordance with an embodiment of the present invention.

Referring now FIG. 1, shown is a block diagram of a portion of a receiver in accordance with an embodiment of the present invention. As one example, receiver 100 may be a single chip CMOS-based short range packet radio receiver. However, persons of ordinary skill in the art understand that embodiments are not so limited and in other implementations a receiver can be formed of multiple semiconductor components and/or may be a wider range receiver such as a broadcast receiver or a receive portion of a transceiver used for wireless communication in accordance with a given wireless communication protocol.

As seen in FIG. 1, receiver 100 may receive incoming RF signals from an antenna 110 at a low noise amplifier (LNA) 120. In turn, an amplified RF signal from the LNA is provided to a mixer 125. In various embodiments, mixer 125 downconverts the incoming RF signal to a desired frequency which can be, in some embodiments an intermediate frequency such as a low intermediate frequency (LIF) or a zero intermediate frequency (ZIF). As seen, mixer 125 thus mixes the incoming RF signal with a local oscillator (LO) signal received from a synthesizer 130. In some implementations, mixer 125 can be a complex mixer to thus provide quadrature signals for further processing.

Referring to FIG. 1, the downconverted signal, e.g., at an IF frequency, is provided to a programmable gain amplifier (PGA) 135. In various embodiments, PGA 135 can be controlled to provide a variable amount of gain, e.g., according to gain control circuitry (not shown in FIG. 1 for ease of illustration). The amplified signal from PGA 135 can be provided to a filter 140 which may be a pre-channel filter. However, persons of ordinary skill in the art understand that in some implementations this pre-channel filter may not be present.

The filtered output from filter 140 in turn is provided to a DC filter 150, which may provide DC filtering to thus remove DC offsets that may be present in the incoming signal. This filter may thus remove any DC offset in the RF mixer stage and subsequent circuitry such as the PGA. In the context of a LIF or ZIF receiver, the received signal spectrum is overlapping or closely positioned relative to the DC offset component. As a demodulation process is predicated on a certain signal-to-noise ratio (SNR) to reliably receive a desired signal, the DC offset can be removed to avoid reduction in SNR. As will be described further below, in some embodiments DC filter 150 can be implemented using a recursive filter.

Furthermore, in accordance with an embodiment of the present invention, state information from DC filter 150 can be obtained and stored at an appropriate point during the signal processing to enable a more rapid settling of the DC filter (and thus receiver) on another enabling of the receiver. As seen, DC filter 150 may be coupled to a controller 170. As an example, controller 170 may be a microcontroller unit (MCU) of the receiver. Furthermore as seen, controller 170 can include a storage 175 in which the filter state can be stored. However, persons of ordinary skill in the art understand that the location of the state storage within other locations of the receiver than within in the controller.

Still referring to FIG. 1, the filtered signal from DC filter 150 may be provided to another filter 155, which in various embodiments can be a channel filter. In turn, the channel filtered signal can be provided to a demodulator 160 which may thus demodulate its incoming signal to provide a demodulated output, namely a demodulated signal, which can be demodulated audio or other content. As examples, demodulator 160 can be configured to demodulate in accordance with a given modulation scheme such as frequency shift keying (FSK), on-off keying (OOK), binary phase shift keying (BPSK), offset quadrature phase shift keying (O-QPSK), orthogonal frequency division multiplexing (OFDM), or so forth. Of course other demodulation schemes are possible.

As further seen in FIG. 1, a quality detector 165 can be coupled to demodulator 160 to determine a quality level of the demodulated signal. Various quality metrics can be analyzed. For example, receiver quality metrics that can be determined in the detector include a preamble received indication, valid synchronization word detect indication, radio signal strength indicator (RSSI) level above a certain value, error vector magnitude (EVM) less than a certain value, eye opening more than a certain value, cyclic redundancy check (CRC) received correctly, etc. Furthermore, persons of ordinary skill in the art understand that this quality analysis may be based on the demodulated signal or on the incoming signal obtained at one or more points within the receive signal processing path.

From this analysis performed in quality detector 165, a quality indicator may be communicated to controller 170 when a given quality level of the demodulated signal and/or a quality metric with respect to the RF signal and a signal being processed in the receiver has been attained. For example, the quality indicator can be sent when at least one of the receiver quality metrics exceeds a threshold level, or a given data was correctly received. In various embodiments, this quality indicator may be used by controller 170 to cause a storage of the filter state from filter 150. Thus as seen in FIG. 1, responsive to a quality indicator received in controller 170 (and an active receiver enable signal), it may issue a store signal (not shown in FIG. 1) to DC filter 150, which causes a state of the filter to be stored in storage 175. Although shown with this particular implementation in the embodiment of FIG. 1, persons of ordinary skill in the art understand the scope of the disclosure is not limited in this regard. Persons of ordinary skill in the art understand that the DC filter might also be positioned between the mixer and the PGA, or, between the channel filter and the demodulator.

Figure 2:
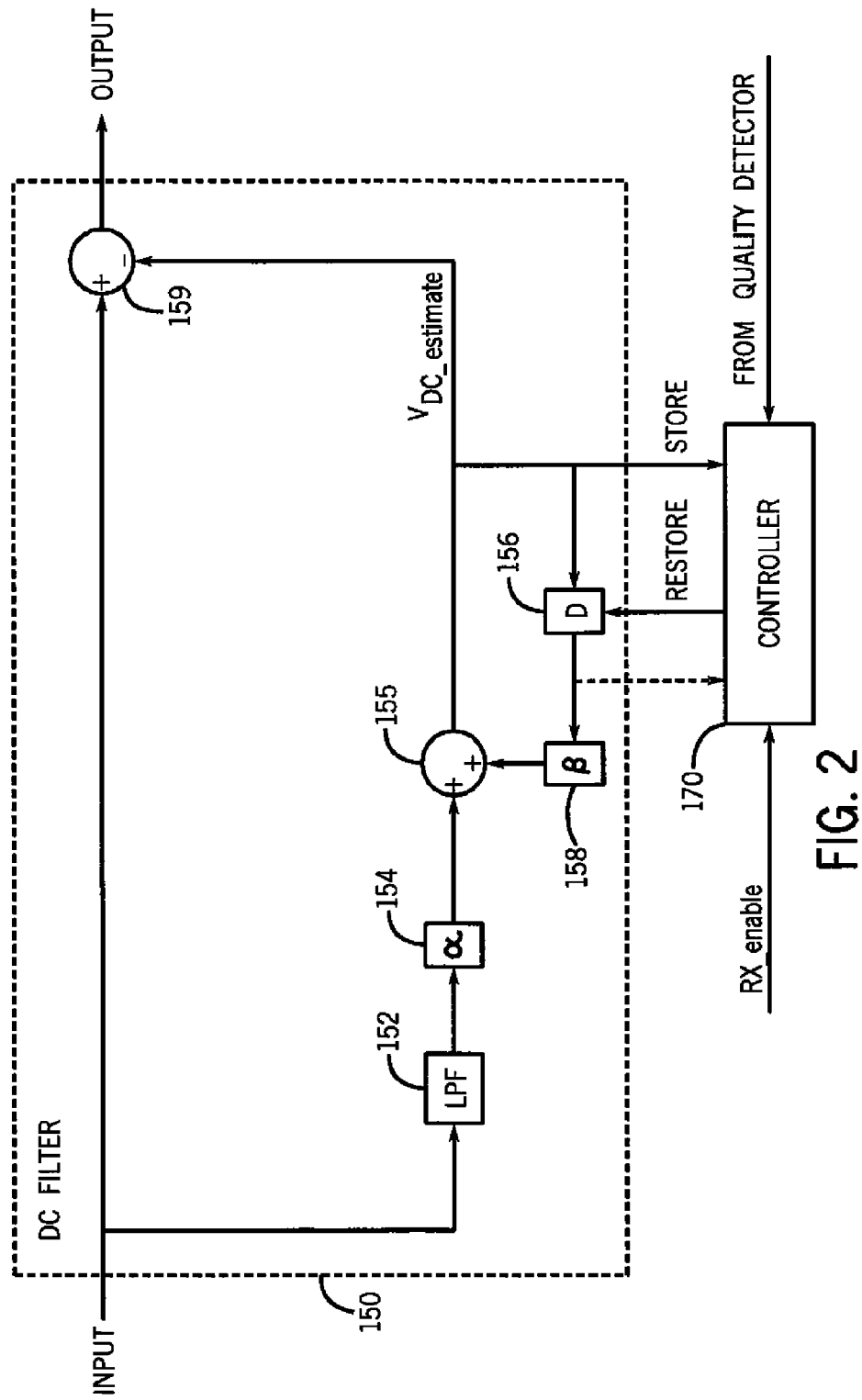
FIG. 2 is a block diagram of a filter in accordance with an embodiment of the present invention.

Referring now to FIG. 2, shown is a block diagram of a filter in accordance with an embodiment of the present invention. As shown in FIG. 2, filter 150 may correspond to DC filter 150 of FIG. 1. Persons of ordinary skill in the art understand that although store and restore operations with regard to filter state of DC filter 150 are described herein, in other implementations storing and restoring a filter state can be performed in connection with other filters, operating at different frequencies as well as different types of filters including feedback filters, feed forward filters, finite impulse response filters and so forth. For example, an analog filter can store and restore state information using capacitors or an ADC/DAC using digital memory. It is to be understood that filters can be analog or digitally-based filters.

As seen in FIG. 2, DC filter 150 is configured to receive an incoming signal which can be at a given frequency, e.g., an IF frequency. This incoming signal can be provided first to a low pass filter (LPF) 152 that filters the incoming signal and provides it to an amplifier 154 (note that this front end LPF is optional and may not be present in given embodiments). In general, amplifier 154 may be configured as a multiplier to obtain a product of the incoming signal and a coefficient, alpha ($\alpha$). This product can be provided to a combiner 155 where it can be added with another product obtained from a feedback path. Specifically as seen in FIG. 2, a DC estimate value ($V_{DC\_estimate}$) output from combiner 155 can be provided to a delay cell 156 which thus stores the DC estimate for a given sample. In turn, the output of delay cell 156 may be provided to another amplifier 158, which obtains a product of this delayed DC estimate value and another coefficient, beta ($\beta$). Accordingly, these two products are summed in combiner 155, where the result corresponds to a DC estimate for a current sample. As seen, this current sample ($V_{DC\_estimate}$) is provided both to delay cell 156 and to another combiner 159, where it is subtracted from the input signal. Accordingly, the output of combiner 159 may correspond to the input signal, filtered of any DC component.

As further shown in FIG. 2, controller 170 may be coupled to filter 150 to control store and restore operations. More specifically, when instructed by a quality indicator received from a quality detector, controller 170 may store a value of the filter output into a storage, e.g., within controller 170 or at another location. Note that the location from which the filter value is obtained can vary. As seen, in different implementations this value can be obtained from the input or output of delay cell 156 (e.g., a previous filter sample or current filter sample).

Furthermore, to realize quick re-settling of DC filter 150 embodiments may, upon powering up of a system including the receiver, provide the stored state to delay cell 156 and beginning re-settling of the filter. This DC estimate may be used to thus enable rapid re-settling. While shown with this particular implementation in the embodiment of FIG. 2, persons of ordinary skill in the art understand the scope of the present invention is not limited in this regard. For example, in some embodiments the low pass filter may not be present. Furthermore, although shown as a recursive low pass filter in the embodiment of FIG. 2 which acts as a unity gain filter, other filter implementations, both digital or analog are possible. For example, a filter having multiple delay cells can be provided, and where a combined state of all the delay cells can be stored responsive to a store request signal.

Note that an initial settling of filter 150 can consume many samples of an incoming signal. However, using a stored state of the filter for a re-settling, many fewer samples can be used to re-settle the filter. Thus re-settling can consume a substantially smaller time period than an original settling. As one example when the DC filter is used in an IF portion of a receive signal processing path of a short range radio, an initial settling can consume between approximately 200 and 400 samples, while for a re-settling much fewer samples, e.g., between approximately 0 and 20 samples may be consumed.

The settling time can depend upon the speed of the filter, which can be controlled by appropriate values of the coefficients of amplifiers 154 and 158. This setting time may also depend on DC suppression. In general direct conversion receivers implement more DC suppression than low IF receivers because a low IF receiver may provide some filtering of the DC component. In one embodiment, coefficient $\alpha$ used for amplifier 154 may be set equal to $1-\beta$, where $\beta$ is the coefficient used for second amplifier 158, and which may be set in this embodiment between 0 and 1. By setting $\beta$ relatively low, a higher alpha value is provided and thus the feedback mechanism is relatively slow, causing a longer settling time and better suppression of the DC component. Instead when a faster feedback mechanism is provided by implementing a greater beta value, a faster settling time may be realized, albeit with a higher filter cutoff frequency. The higher cutoff frequency may filter out a part of the received signal spectrum, which sets a limit on the settling time.

With regard to a particular implementation of a receiver, it can be assumed that the DC offset may be a relatively low value, e.g., between approximately 0.05% and 0.1%, due to a CMOS receiver design having good matching that seeks to avoid nonlinearities and minimize DC offset. Assume in this case that an expected level of the input signal can be approximately 1V. With an expected DC offset of 0.1%, the DC offset may correspond to approximately 1 mV of offset. On an initial settling time when the filter state starts at zero (e.g., no value is stored in the delay cell), a large number of samples may be processed within the receiver signal processing path including the filter before an appropriate DC estimate is obtained. Assume that at the completion of settling of the DC filter, the DC estimate substantially corresponds to the actual DC offset. Accordingly, this DC estimate can then be stored in a storage of the receiver so that upon a later re-powering of the receiver and re-settling of the filter, a much more rapid settling can occur by restoring this stored DC estimate into the filter prior to initiation of re-settling.

Figure 3:
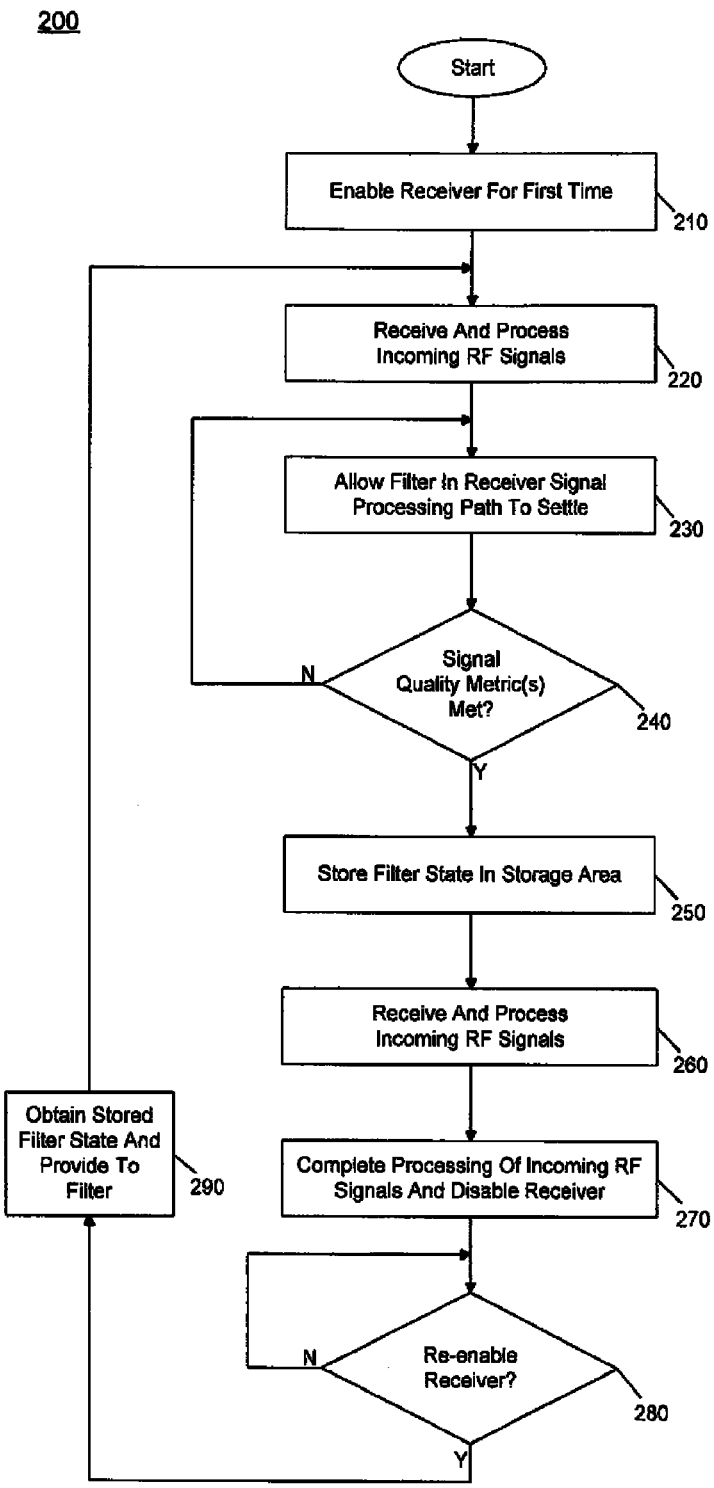
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be performed by various circuitry and logic within a receiver, including a receiver signal processing path and a controller that can control the storing and restoring of filter state data into one or more filters of the receiver signal processing path. As seen, method 200 may begin by enabling a receiver for the first time (block 210). For example, an incoming control signal to enable the receiver may be used to cause the receiver to be powered up. Note that this first enabling of the receiver is for a particular power on or boot cycle of a system including the receiver. That is, this first enabling can occur multiple times, namely on every different powering up of a system including the receiver. This is so, as the state data obtained, stored and restored can be stored in a volatile memory such that this data is lost when the overall system is powered down. Note that in some embodiments it may be possible to store the filter state data in a non-volatile storage or a low power RAM that retains the stored DC estimate in a low power inactive mode (sleep or standby), at least prior to powering down the receiver. In this way, filter state data obtained once can be stored in the non-volatile memory and restored back to the filter upon every powering up of the receiver. However, since a receiver ages and undergoes various changes, e.g., in temperature and voltage, this state data may not be of the greatest accuracy. Instead, generating new filter state data on each powering of the receiver may provide for better performance.

Still referring to FIG. 3, control passes to block 220 where an incoming RF signal can be received and processed in the signal processing path. As part of this processing, one or more filters in the receiver processing path can be allowed to settle. Accordingly at block 230 at least a DC filter can be allowed to settle. At diamond 240 it can be determined whether at least one received signal quality metric has been met. As discussed above, different signal quality metrics can be analyzed. If the metric or metrics have not been met, control passes back to block 230 for further allowing of settling of the filter. Accordingly, during this time the processed information from the receiver such as demodulated signals may not be of a desired quality due to the uncompleted settling of one or more filters.

When at diamond 240 it is determined that the one or more signal quality metrics have been met, control passes to block 250 where the filter state can be stored in a storage area. The storage area can be RAM or other storage within the receiver, in various embodiments. Thus because the filter has settled, incoming RF signals can be received and processed (block 260). Accordingly, demodulated signals at this point may be of a desired quality and can be provided to an end user, e.g., as output demodulated audio signals or to another location when the signals are a communication of data information.

At block 270, processing of the incoming RF signals can be completed and accordingly the receiver can be disabled, e.g., to reduce power consumption. For example, assume the context of a portable device used for packet-based short range wireless communications of data. In this context, a receiver may be powered up temporarily to determine whether any RF signals are directed to the receiver. If not, the receiver can be placed back into a low power mode and disabled. For example, the radio can be configured to periodically be enabled to detect whether any packets are received. If there is no preamble detected, the receiver can be rapidly disabled. Instead, upon a valid preamble detection, the receiver can remain on to obtain a full packet or at least a portion thereof to determine whether the packet is directed to the receiver. If so, the radio can remain on for a longer time period to receive the full packet. Otherwise, it can be powered off.

Still with reference to FIG. 3, control passes to diamond 280 where it can be determined whether the receiver is to be re-enabled. This determination may be based on, e.g., receipt of a timing, interrupt or other signal to cause the receiver to again be powered up. Note that in this instance however, because a previous filter state value was stored away, this value can be obtained and provided to the filter (block 290). In some embodiments, a timer timeout may occur after re-powering the receiver and before proceeding to block 290 to allow for settling time of certain receiver blocks in front of the DC filter (e.g., PGA, ADC, decimation filtering, etc.). Control thus passes back to block 220 for receipt and processing of the incoming signals as discussed above. However, at this point because the filter state provided is likely close to the appropriate filter state, the settling time for the filter and thus the receiver can be greatly reduced, allowing for more rapid output of a useful data as well as reducing power consumption.

Although shown with this high level operation in the embodiment of FIG. 3, persons of ordinary skill in the art understand the scope of the present invention is not limited in this regard. For example, the flow shown in FIG. 3 thus causes a storing of updated state information each time that a receiver is re-enabled. Although this may provide for more accurate filter state updates, in some embodiments a determination may be made on each re-enabling whether it is appropriate to update the filter state. For example, if it is determined that the temperature of the receiver is at the same temperature as a prior re-enabling of the receiver, the filter state store operation can be avoided. Or, such operation can be avoided if the receiver temperature is within at least a threshold level of a previous enabling of the receiver. Still further, persons of ordinary skill in the art understand that the decision whether to store an updated filter state value can be based on other criteria in different embodiments.

Figure 4:
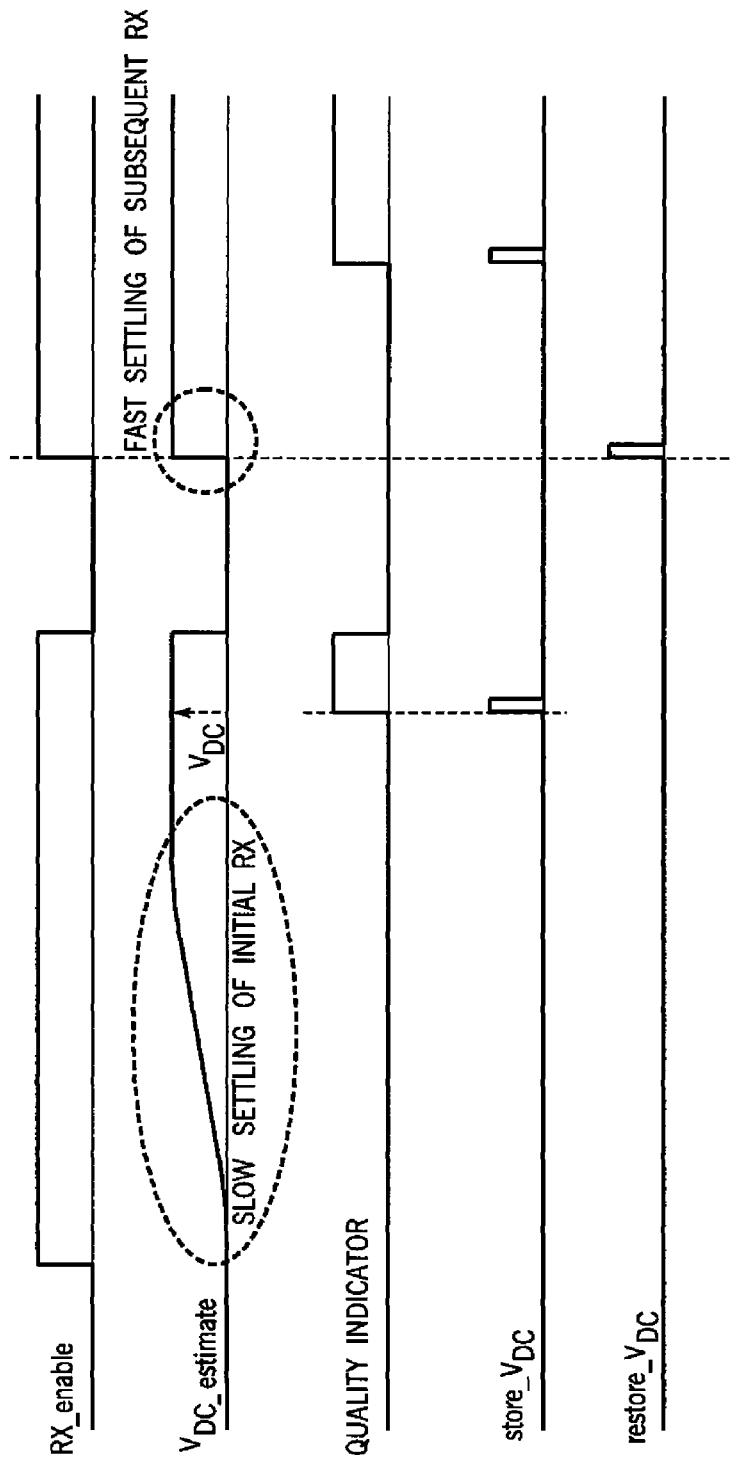
FIG. 4 is a timing diagram of various operations performed in accordance with an embodiment of the present invention.

Referring now to FIG. 4, shown is a timing diagram of various operations performed in accordance with an embodiment of the present invention. As shown in FIG. 4, a receive enable signal (Rx_enable) can be active when a receiver is to be powered up for operation. When the receiver is first powered up, note the slow settling time for generating a filter state value, namely the DC estimate ($V_{DC\_estimate}$). As discussed above, the slow settling time may be due to starting the filter without any prior state value. Accordingly, a number of incoming samples are processed in the filter prior to obtaining an appropriate filter state.

As next seen in FIG. 4, a quality indicator signal may be activated when a received signal metric meets a threshold level. As discussed above this metric may vary in different embodiments and can correspond to a SNR estimate, RSSI estimate, valid data detections, combinations thereof, or so forth. Responsive to enabling of this quality indicator, a controller or other logic may generate a signal (Store_$V_{DC}$) that causes the current filter state to be stored. The receiver may continue operation and may thereafter enter into a disabled state by resetting of the receive enable signal.

From the disabled state, the receiver can again be re-enabled responsive to an active receive enable signal. At this time, the controller can generate a restore signal (Restore_$V_{DC}$) to provide the previously stored state value to the filter. Accordingly, the filter may rapidly settle, as this stored state value may be very close to the actual state value. Note that as time proceeds, the quality indicator can be activated as appropriate, which in turn causes a new state of the filter to be stored responsive to the store state signal. In this way, it is possible for a more accurate state value to be provided on re-enabling of the receiver. Although shown with these particular signals in the embodiment of FIG. 4, persons of ordinary skill in the art understand that other signals or arrangements are possible in different embodiments.

Figure 5:
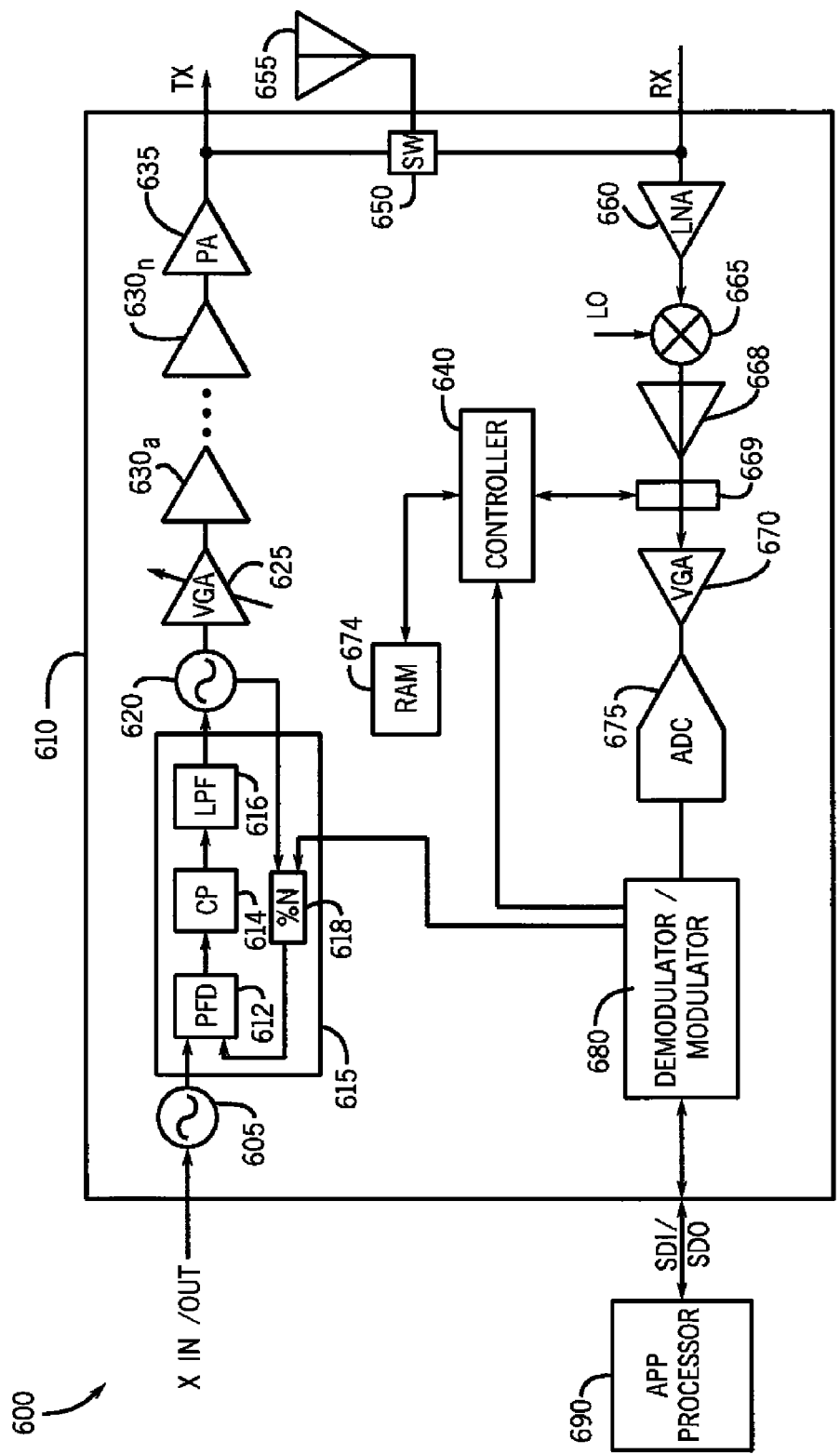
FIG. 5 is a block diagram of a system in accordance with an embodiment of the present invention.

Referring now to FIG. 5, shown is a block diagram of a system in accordance with an embodiment of the present invention. As shown in FIG. 5, system 600 may take various forms, e.g., corresponding to a consumer device including a transceiver 610 in accordance with an embodiment of the present invention. The consumer device can take many different forms, such as a given security or monitoring device, reader device, ISM device or so forth, and which includes the transceiver, e.g., to provide for short-range wireless communication. For ease of illustration, the only components of the system shown in FIG. 5 are an application processor 690, transceiver 610, and an antenna 655. Persons of ordinary skill in the art understand however that various other components may be present in a given embodiment.

In a transmit direction, data to be transmitted may be provided from application processor 690 via a serial data port, which is coupled to a modulator/demodulator 680. The modulated information can be provided to a phase lock loop (PLL) 615, which provides the modulated signal to a voltage control oscillator (VCO) 620 where it is upconverted to a RF frequency. As seen, PLL 615 may be fractional-N PLL including a phase frequency detector 612, coupled to receive a reference frequency via an oscillator 605, a charge pump 614, a low pass filter 616, and an N divider 618.

The resulting RF signal is provided to a VGA 625 to provide a variable gain to the RF signal. As seen, multiple fixed gain stages $630_a$-$630_n$ may be coupled between VGA 625 and a power amplifier 635, which outputs an amplified signal through an antenna switch 650 to antenna 655.

In a receive direction, incoming RF signals may be coupled through switch 650 to a receive path including a low noise amplifier (LNA) 660, which provides an amplified output to a mixer 665, which downmixes the signal according to an LO frequency which may be received, in one embodiment from VCO 620.

The downmixed signal, which may be at a low IF or zero IF frequency, is provided through a PGA 668, a DC filter 669, a VGA 670 and an analog-to-digital converter (ADC) 675, which provides a digital bit stream to demodulator 680, which demodulates the information and communicates it to application processor 690.

As further seen, a controller 640 such as a microcontroller unit (MCU) may be coupled to filter 669 to control the storing of filter state information into a memory 674, which in the embodiment of FIG. 5 is a RAM. To this end, the controller may include a non-transitory storage medium to store instructions to enable control of store and restore operations for filter state information as described herein. Demodulator 680 also may couple to controller 640 to provide demodulated signals, as in this embodiment controller 640 may further perform a quality detection based on the demodulated signals in order to control the storage of the filter state. Furthermore, persons of ordinary skill in the art understand that although a transceiver is shown in the FIG. 5 embodiment, in other implementations a standalone receiver can include a mixer having a filter and state storage control as described herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a signal processing circuit to receive and process an incoming radio frequency (RF) signal to obtain a demodulated signal, the signal processing circuit including a filter, the filter comprising;
   a first amplifier to receive a downconverted signal obtained from the incoming RF signal, the first amplifier having a first programmable amplification value and to output a first amplifier value;
   a second amplifier to receive an output of a delay cell, the second amplifier having a second programmable amplification value and to output a second amplifier value;
   a combiner to sum the first and second amplifier values to generate a filter estimate; and
   a second combiner to remove the filter estimate from the downconverted signal to output a filtered signal;
a quality detector circuit to detect a quality level of the demodulated signal and to output a quality indicator based on at least one of the quality level of the demodulated signal, a quality metric of the incoming RF signal, and a quality metric of a signal within the signal processing circuit; and
a controller coupled to the filter, the controller, responsive to the quality indicator, to cause a state of the filter to be stored in a memory coupled to the filter.

2. The apparatus of claim 1, wherein the controller is to cause the state of the filter stored in the memory to be restored to the filter when the apparatus is re-enabled from a low power state.

3. The apparatus of claim 1, wherein the controller is to restore the state to the delay cell.

4. The apparatus of claim 3, wherein the controller is to receive the state from an input to the delay cell.

5. The apparatus of claim 1, wherein the quality detector circuit is to output the quality indicator when a first quality metric of the demodulated signal reaches a threshold level.

6. A method comprising:
receiving and processing an incoming radio frequency (RF) signal in a receiver to obtain a demodulated signal;
allowing a filter in a signal processing path of the receiver to settle;
storing a state of the filter in a storage area responsive to a signal quality metric of the demodulated signal being at least at a threshold level;
obtaining the stored state from the storage area and providing the stored state to the filter when re-enabling the receiver after disabling of the receiver; and
not storing an updated state of the filter in the storage area after re-enabling of the receiver if a temperature of the receiver has not changed since a prior enabling of the receiver.

7. The method of claim 6, further comprising storing an updated state of the filter in the storage area after re-enabling of the receiver and responsive to the signal quality metric of the demodulated signal being at least at the threshold level.

8. The method of claim 6, further comprising causing the state to be stored responsive to a quality indicator signal generated by a quality detector when the signal quality metric reaches the threshold level.

9. The method of claim 6, wherein the signal quality metric is at least one of a preamble detection, a synchronization word detection, a valid checksum computation and a received signal strength indicator.

10. A system comprising:
a low noise amplifier (LNA) to receive and amplify a radio frequency (RF) signal having a first frequency;
a mixer to receive and downconvert the RF signal to a second frequency signal;
a filter to receive and filter the second frequency signal to generate a filtered signal;
a demodulator to receive and demodulate the filtered signal to output demodulated data;
a quality detector to detect a quality of the demodulated data and to output a quality indicator based on at least one of the quality of the demodulated data, a quality of the RF signal, and quality of the second frequency signal; and
a controller coupled to the filter, the controller, responsive to the quality indicator, to cause a state of the filter to be stored into a storage, wherein the controller is to cause the state to be stored in a memory of a radio including a receiver, to cause the state stored in the memory to be restored to the filter when the receiver is re-enabled from a low power state, and wherein the filter comprises a DC filter and restoring of the stored state enables the DC filter to re-settle within a first time period, the first time period substantially less than a second time period at which the DC filter settles without the stored state.

11. The system of claim 10, wherein the filter comprises a recursive filter.

12. The system of claim 11, wherein the recursive filter comprises:
a first amplifier to receive the second frequency signal, the first amplifier having a first programmable amplification value and to output a first amplifier value;
a second amplifier to receive an output of a delay cell, the second amplifier having a second programmable amplification value and to output a second amplifier value;
a combiner to sum the first and second amplifier values to generate a filter estimate; and
a second combiner to remove the filter estimate from the second frequency signal to obtain the filtered second frequency signal.

13. The system of claim 12, wherein the controller is to restore the state to the delay cell.

14. The system of claim 12, wherein the controller is to receive the state from the output of the delay cell.

15. The system of claim 10, wherein the controller is to not store an updated state of the filter in the memory after re-enabling of the receiver if a temperature of the receiver has not changed since a prior enabling of the receiver.

* * * * *